United States Patent [19]
Solberg

[11] Patent Number: 4,856,276
[45] Date of Patent: Aug. 15, 1989

[54] VARIABLE MASS FLOW RATE SOLID PROPELLANT GRAIN

[75] Inventor: Mark A. Solberg, Edgewood, Md.

[73] Assignee: Morton Thiokol, Inc., Chicago, Ill.

[21] Appl. No.: 62,531

[22] Filed: Jun. 12, 1987

[51] Int. Cl.⁴ .............................. F02K 9/08; F02K 9/12
[52] U.S. Cl. ......................................... 60/250; 60/254; 102/287
[58] Field of Search ................. 60/250, 253, 254, 255; 102/286, 287, 290

[56] References Cited

U.S. PATENT DOCUMENTS

| | | | |
|---|---|---|---|
| 3,128,600 | 4/1964 | Oldham | 60/250 |
| 3,427,805 | 2/1969 | Osburn | 60/253 |
| 3,430,445 | 3/1969 | Smith, Jr. | 60/250 |
| 3,609,977 | 10/1971 | McCormick | 60/250 |
| 3,888,079 | 6/1975 | Diesinger | 60/254 |

Primary Examiner—Louis J. Casaregola
Assistant Examiner—Timothy S. Thorpe
Attorney, Agent, or Firm—James C. Simmons; Gerald K. White

[57] ABSTRACT

A solid propellant grain for a gas generator such as a missile canister erection actuator. The grain provides a sustain phase followed by a boost phase which may then be followed by another sustain phase. The aft portion of the grain may have the configuration of an end burner to provide the initial sustain phase. The middle portion contains a longitudinally extending cavity in which is disposed a plug for supporting the grain during the initial sustain phase against collapse or cracking. A gap is provided between the plug and the wall of the cavity to provide effective propellant burnign surface area along the cavity wall for the boost phase. The cavity and plug, which terminate at the aft portion, may extend longitudinally through the forward portion of the grain. In order to provide another sustain phase after the boost phase, an insulating inhibitor material is disposed between the plug and the propellant material in the forward portion and is bonded to the propellant material so that the forward portion of the grain becomes an end burner.

20 Claims, 3 Drawing Sheets

VARIABLE MASS FLOW RATE SOLID PROPELLANT GRAIN

The present invention generally relates to solid propellant grains and to gas generators including rocket motors which employ solid propellant grains. More particularly, the present invention relates to solid propellant grains which have variable mass flow rates and to gas generators which employ them.

It is often considered desirable to vary the mass flow rate of the solid propellant in a rocket motor to, for example, provide a high pressure high acceleration boost phase of operation followed by a low pressure sustain phase. A variable mass flow rate rocket motor may be provided by varying the grain design configuration. For example, the aft portion of a grain may be provided with a star configuration perforation extending axially thereof to provide a large propellant burning surface area wherein the propellant burns radially as well as axially for a boost phase of motor operation. The forward portion of the grain may be constructed as an end burner wherein the grain portion is not perforated or, if perforated, the surface area defining the perforation is inhibited so that the propellant burns only axially of the grain portion for a sustain phase of operation.

A variable mass flow rate may also be provided by a pulsed rocket motor such as disclosed in U.S. Pat. No. 3,888,079 to Diesinger. Such a rocket motor closed in Diesinger, has at least two coaxial combustion chambers with one arranged behind the other wherein the forward combustion camber grain may be configured for a boost phase and the aft combustion chamber grain may be configured for a sustain phase. Such pulsed motors, which require elaborate bulkhead configurations separating the combustion chambers, are not suitable for many applications such as in actuators for erecting missile canisters wherein an inexpensive and non-complicated yet reliable grain configuration is desired.

Usually, however, grains have been configured to provide an initial boost phase followed by a sustain phase of operation to comply with typical rocket motor requirements. However, there are solid propellant grain requirements wherein it is desired to provide a lower mass flow sustain phase initially followed by a higher mass flow boost phase. Furthermore, it may be desirable to follow the boost phase by another sustain phase. For example, in a missile canister erection actuator, the pressure required to maintain the canister in the vertical position is relatively low compared to the pressure required to react to launch loads. Thus, it is necessary to further pressurize the actuator in a very short time so that it may withstand the high forces encountered during launch and not collapse. After this higher pressure has been built up in the actuator, it may then be desired to sustain that pressure for a period of time during which the missile can be launched. Thus, it is considered desirable that such an actuator grain have end portions which have a low burning surface area for sustain operation and a middle portion which has a high burning surface area for a boost phase of operation.

For a relatively low gas generation sustain phase, a propellant grain portion may typically be what is known as an end burner, i.e., the grain portion is not provided with a perforation, or, if it is perforated, the surface along the perforation is inhibited. As a result, the flame front is along a surface which is disposed generally normal to the longitudinal axis, and the flame propagates in a direction longitudinally of the grain portion from the aft end toward the forward end thereof. On the other hand, a boost phase grain portion may be perforated longitudinally thereof so that the flame not only may propagate in a direction longitudinally thereof but also propagates from within the perforation in directions radially of the grain portion to thereby generate gas at a more rapid rate.

The use of combustion barriers which are bonded to the propellant grain, such as disclosed in U.S. Pat. No. 3,427,805 to Osburn, provides a means for selectively reducing burn rate where that is desirable but does not adequately afford a means for providing a relatively slow burning aft end burner grain portion followed by a faster burning grain portion.

During burning of an end burner grain portion, gases are generated which cause pressures to be exerted on the grain. Solid propellant grains are typically composed of a low modulus elastomeric material which, if not adequately supported, may tend to crack or "cave in" under such pressures. Such cracking may result in so much additional burning surface area that detonation may undesirably occur. Thus, the difference in pressure between the pressure exerted by the generated gases around a grain and the relatively low pressure within a grain middle portion cavity may result in undesirable cracking of the propellant or "caving in" thereof.

It is an object of the present invention to provide a solid propellant grain which burns to provide a relatively low mass flow sustain phase followed by a higher mass flow boost phase of operation and which reliably does not crack during the sustain phase.

It is another object of the present invention to provide such a solid propellant grain wherein the boost phase is then followed by another relatively low mass flow sustain phase.

It is a further object of the present invention to provide a solid propellant gas generator which operates over variable mass flow levels without the requirements of either a variable control valve or multiple propellants or multiple igniters.

It is yet another object of the present invention to provide an inexpensive and non-complicated yet reliable solid propellant grain for a missile canister erection actuator.

The above and other objects, features, and advantages of this invention will be apparent in the following detailed description of the preferred embodiments thereof which is to be read in connection with the accompanying drawings.

IN THE DRAWINGS

FIG. 3 is a sectional longitudinal view of the

Figure 2:
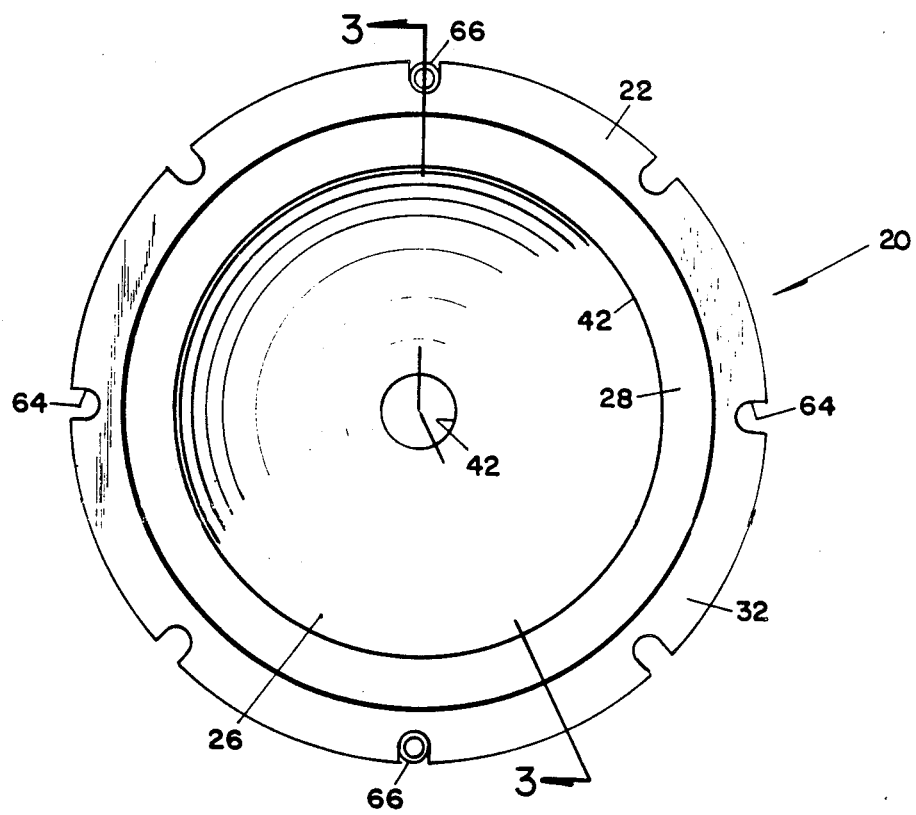
FIG. 2 is an end view of a gas generator which embodies the present invention.
Figure 3:
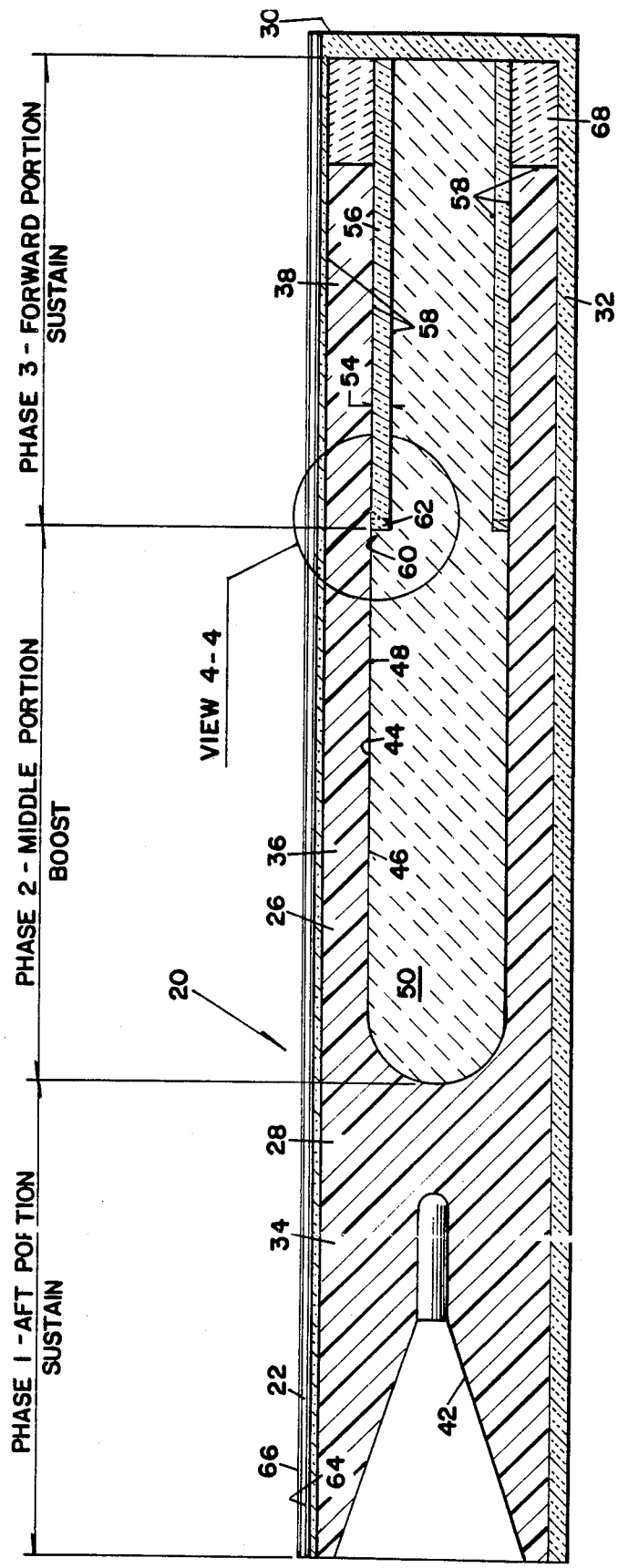
Figure 4:
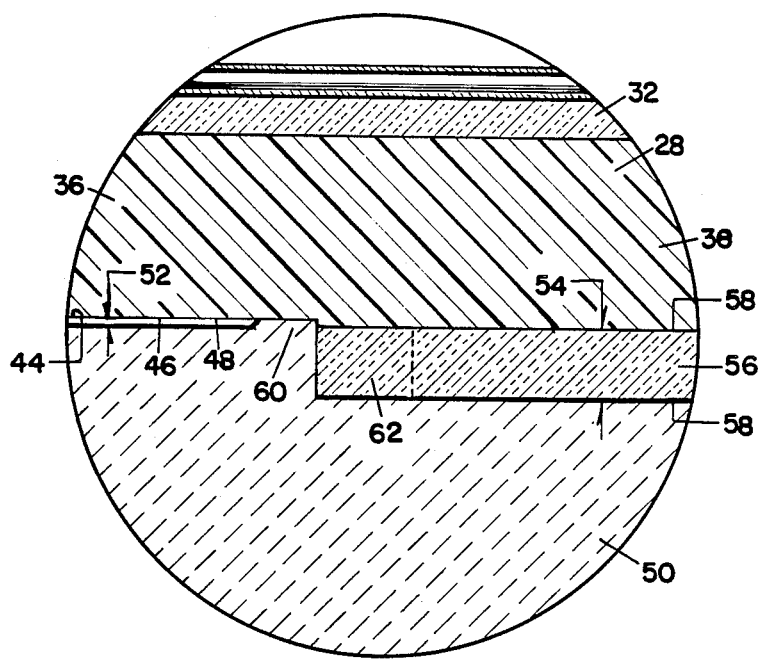

FIG. 2 taken along the lines 3—3 thereof;

FIG. 4 is a close-up view of the portion 4—4 of FIG. 3; and

Figure 5:
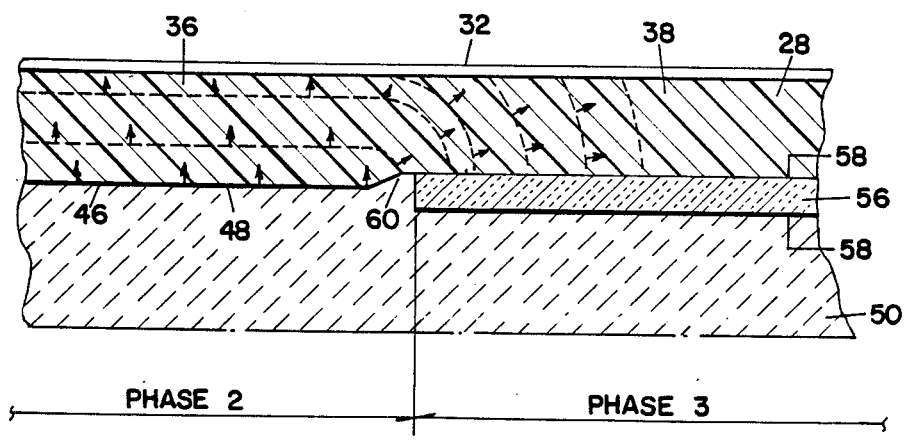

FIG. 5 is a schematic view of a portion of the grain of FIG. 3 illustrating the pattern of flame propagation.

DETAILED DESCRIPTION OF THE PREFERRED EMBODIMENTS

Figure 1:
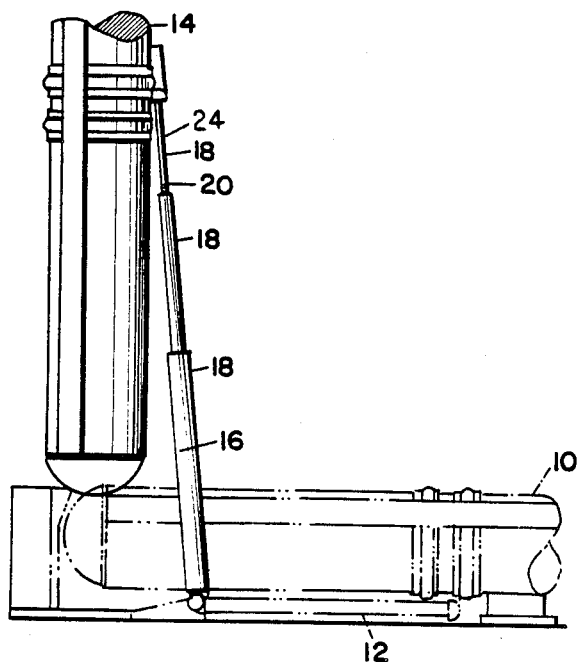
FIG. 1 is a side view of an erection actuator connected to a missile canister in both erected (solid lines) and unerected (phantom lines) positions and which is powered by a solid propellant grain which embodies the present invention.

Referring to FIG. 1, there is illustrated at 10 in phantom lines a canister for launching a missile. The canister 10 lies horizontal to the ground in a stored position. Illustrated at 12 in phantom lines is an actuating device 12 for moving the canister 10 to a vertical or near vertical position for launch. Illustrated at 14 is the canister in the vertical or near vertical position. Illustrated at 16 is the actuator after it has effected movement of the canister 14 into the vertical position. The actuator 16 includes a series of telescoping members 18 which are powered for rapid erection of the canister 14 for launch by a gas generator generally illustrated at 20 which may have a length typically of about 25 inches and a diameter of typically about 4.5 inches.

The gas generator 20 is shown in greater detail in FIGS. 2, 3, and 4. The gas generator 20 is constructed as an elongated generally cylindrical cartridge 22 which preferably is insertable in the smallest diameter telescoping member which in this case is the upper actuator telescoping member 18 which serves as a casing 24 therefor. After use of the cartridge 22 for canister erection, it may be replaced by another one. It is however not essential to the present invention that the gas generator be a cartridge. For example, in a rocket motor application, the propellant grain insulator may be suitably bonded to the rocket motor case.

The gas generator 20 includes a solid propellant grain 26 which is composed of an elongated generally cylindrical mass 28 of solid propellant material. The solid propellant material 28 may be composed of any suitable material such as, for example, the following composition wherein the percentages are by weight percent:

| | |
|---|---|
| Liquid carboxy terminated polybutadiene polymer (fuel) | 18.73% |
| Liquid epoxide curative (fuel) | 1.0% |
| Chromium octoate cure catalyst | 0.02% |
| Thermax carbon black opacifier | 0.25% |
| Oxamide granular coolant, burn rate suppressant (fuel) | 2.50% |
| Dihydroxyoxime ($C_2H_4O_4N_2$) granular monopropellant (oxidizer and fuel) | 32.00% |
| $NH_4ClO_4$ granular oxidizer | 45.50% |

The first two materials listed above are adjusted slightly in accordance with principles commonly known to those of ordinary skill in the art to which this invention pertains to control propellant tensile properties. Although this propellant material is a preferred propellant material for use in canister erection actuators, it should be understood that this invention is not limited to this particular propellant material but may include any propellant material suitable for a particular application.

Bonded to the propellant material 28 for disposition between the propellant material 28 and the casing 24 over the length of the propellant material 28 and bonded to the forward end 30 of the propellant cartridge 22 is a layer of insulating material 32 which may be composed of any material providing suitable insulation such as, for example, EPDM. In this specification and the claims, the term "aft end" is meant to refer to the end of a grain which is adapted for initiation of burning, and the "forward end" is meant to refer to the other end of a grain.

For convenience of illustration, the grain 26 will be divided into an aft portion 34, a middle portion 36, and a forward portion 38. Burning of the grain 26 will begin at the aft portion 34 and terminate at the forward portion 38, and a suitable igniter (not shown) is positioned to initiate burning of the aft portion 34.

In order to raise a typical missile canister to its launch position 14, a pressure ranging from perhaps 3,000 to perhaps 600 psi (pounds per square inch) from the horizontal to the vertical position respectively may be required. In order to attain such a pressure, the aft portion 34 is preferably provided with a generally end burner propellant configuration. As illustrated, the aft portion 34 includes a perforation 42 partially therethrough in order to aid in achieving ignition and to achieve the particular mass flow desired for the sustain phase for raising the canister 14.

The canister 14 must be held in position during launch of a missile therefrom, and greatly increased forces are exerted on the actuator 16 during such a launch. In order to prevent collapse of the actuator 16 during missile launch, a greatly increased pressure over end of stroke actuator pressure of perhaps 3,000 psi is required. In order to achieve such greatly increased pressure, i.e., a boost phase, in accordance with the present invention, a cavity 44, which is preferably coaxial with the grain 26, is caused to extend longitudinally through the middle portion 36 of the propellant mass 28 to provide a propellant wall 46 internally of the grain 26 which wall extends longitudinally over the length of the middle portion 36 and terminates at the aft portion 34 whereby the wall 46 does not extend into the aft portion 34. The wall 46 provides what might be called a buried flame propagation surface 48 within the propellant mass 28 to provide, as illustrated in FIG. 5, propagation of flame in directions radially of the grain 26 over the length of the middle portion 36 for a greatly increased burning surface area and therefore a greatly increased pressure for a boost phase of operation.

The cavity 44 being internally of the grain 26, the forces acting on the propellant mass 28 during the initial sustain phase may cause collapse of the propellant material 28 around the cavity 44 if the wall 46 is not adequately supported. In order to prevent such collapse of the propellant material 28 during the initial sustain phase in accordance with a preferred embodiment of the present invention, the cavity 44 is caused to extend through the forward portion 38 and a supporting plug 50 is inserted into the cavity 44. Although the plug 50 may be composed of any suitable material which may adequately support the propellant material 28 from collapse, it is preferable that the plug 50 be composed of a noncombustible inert material such as, for example, linen phenolic.

Referring to FIG. 4, in order to provide for effective flame propagation along the wall 46 in accordance with the present invention, the plug 50 is sized to provide an air gap, illustrated at 52, between the plug 50 and the wall 46, and the plug 50 is preferably fixed in position as will be hereinafter described to maintain the gap 52 around the plug 50. While the gap 52 should be large enough so as to provide effective flame propagation, it should also be small enough to prevent the propellant material 28 from undesirable cracking which may result in undesirably high pressures or even detonation during burning of the aft portion 34. The size of the gap 52 may vary depending on such factors as the type of propellant material, the temperature range, propellant configuration, and initial pressures, and may be determined using principles commonly known to those of ordinary skill in the art to which this invention pertains. For the propellant material discussed hereinbefore and the configuration and size of grain shown in FIGS. 2, 3, and 4 and discussed herein, the gap 52 is preferably in the range of about 0.010 to 0.030 inch, more preferably about 0.020 inch.

In some applications of the present invention such as for some types of gas generators it is envisioned that it may be desirable to maintain the boost phase throughout the remainder of burning of the propellant grain 26. In order to achieve such results, the gap 52 may be provided to extend over the length of both the middle and forward portions 36 and 38 respectively. In accordance with other applications, once the boost pressure has been achieved, it may be desirable to sustain that higher boost pressure for a period of time. For the actuator 16 application of FIG. 1, once the boost pressure of perhaps 3,000 to 4,000 psi has been achieved, it may be desirable to sustain that pressure for a period of time of perhaps 30 to 60 seconds in order to provide a window during which the missile may be launched from the canister 14. In order to provide such a sustain phase in accordance with a preferred embodiment of the present invention, the portion of the plug 50 within the forward grain portion 38 is sized to provide a gap or space 54 of perhaps one-fourth inch between the plug 50 and the wall 46 which is filled with an insulating material 56 which is bonded to the wall 46 by a suitable bonding material illustrated at 58 to act as an inhibitor along the portion of the wall 46 in the forward grain portion 38 to thus convert the forward grain portion 38 into a slower mass flow rate end burner portion. The insulating material 56 may also be suitably bonded to the plug 50 and may be composed of the same or different material as the insulator 32 is composed. With the insulating material 56 bonded to the wall 46 in the forward portion 38 to act as an inhibitor, the flame front can no longer extend along the wall 46 in the forward portion 38, and the flame can not as a result propagate radially outwardly therefrom. Thus, the surface area along which the flame propagates is decreased significantly from the middle to the forward portion to provide a sustain phase of operation. Referring again to FIG. 5, there is illustrated the change in flame propagation from the rapid burning boost phase of the middle portion 36 wherein the flame propagates radially outwardly as well as longitudinally to provide greater pressure to the slower burning sustain phase of the forward portion 38 wherein the flame propagates longitudinally but not significantly radially for sustaining the pressure buildup which occurs during the boost phase.

The insulating material 56 is poured into the space 54 after the plug 50 has been installed and then allowed to cure and bond to the wall 46 and plug 50. In order to prevent any of the insulating material 56 from getting into the boost phase gap 52 during such pouring and curing, in accordance with a preferred embodiment of this invention a small portion 60 of the plug 50 at the forward end of the middle portion 36 is preferably sized, as best illustrated in FIG. 4, to have the same diameter as the wall 46 so as to form a seal to prevent entrance of insulating material 56 into the gap 52 during pouring and curing thereof as well as to provide uniformity of the gap 52 around the plug 50. In order to further insure that insulating material 56 not get into the gap 52 during pouring and curing thereof, a small portion illustrated at 62 of insulating material, having a depth of perhaps about one-eighth inch, is carefully poured first and allowed to cure after which, with the portion 62 acting as a barrier, the remainder of the insulating material 56 is poured and allowed to cure. The portion 62 may be cured at about 60° F. to 100° F. for one to two hours prior to pouring the rest of the insulating inhibitor material 56 which may then be cured at between about 70° F. to 100° F. for 48 to 60 hours. Prior to pouring the inhibitor material 56, the surfaces to be bonded should be dried for a suitable period of time such as from about 170° F. to 200° F. for 16 to 24 hours, then a suitable bonding material such as Chemlok 205 adhesive should be applied to the surfaces to be bonded and allowed to air dry for 15 to 30 minutes and then cured at about 180° F. to 200° F. for one to two hours. "Chemlok" is a trademark of Hughson Chemicals.

In order to equalize the pressures between the forward and aft ends of the grain 26 for protection thereof during burning, a plurality of vent holes, illustrated at 64 in FIG. 2, are provided in the outer periphery of the insulator 32 to extend longitudinally over the entire length of the grain 26 and open to the forward and aft ends to provide pressure communication therebetween. During burning of the aft grain portion 34, the pressures which are built up including the uniform pressure around the circumference of the grain 26 provided by the vent holes 64 exert radially inwardly acting forces on the propellant material 28 to cause the gap 52 to close. As previously stated, this gap 52 should be small enough that cracking of the propellant material 28 does not occur as the gap 52 is closed. The plug 50 then acts to support the propellant material 28 against collapsing inwardly into the cavity 44 or from cracking.

After the aft portion 34 of the grain has been burned and the flame has propagated to the cavity 44, the pressure then acting on the wall 46 and the pressure around the grain 26 and in the vent holes 64 will equalize and the gap 52 will as a result open enough to provide a large surface area along the wall 46 for propagation of flame in a direction radially of the middle grain portion 36 for more rapid gas generation for the boost phase.

After a missile has been launched, it may be desirable to collapse the telescoping members 18 to reposition the canister in the horizontal position 10. If, after the propellant material 28 has been burned, debris falls to the bottom of the actuator 16, it may cause undesirable binding during the collapsing of the telescoping members 18. In order to prevent such binding from occurring in accordance with a preferred embodiment of the present invention, two or more rigid tubular support members 66 are inserted on opposite sides respectively of the grain 26 in vent holes 64, as illustrated in FIG. 2, to extend over the length of the insulator 32 to prevent its collapse after the propellant material 28 has burned. In addition, a plug 68 of noncombustible or inert material, which may be the same as or different from the material of which plug 50 is composed, is inserted at the forward end 30 of the grain 26 between the insulator 32 and the insulating material 56 and is bonded thereto to hold the insulating material 32 and 56 and the plug 50 in position after the propellant material 28 has burned.

After the propellant material 28 has been poured using a mandrel or mandrels for the cavities including cavity 44 and allowed to cure in accordance with principles commonly known to those of ordinary skill in the art to which this invention pertains, the plugs 50 and 68 are inserted. The insulating material 56 is then poured and allowed to cure and bond to the wall 46 and the surfaces of the plugs 50 and 68 as previously discussed, then the insulating material 32 is poured around the grain and allowed to suitably cure in accordance with principles commonly known to those of ordinary skill in the art to which this invention pertains, and the support members 66 are installed. Alternatively, the insulator 32 may be first prepared and the grain 26 cast therein. When ready for use, the resulting cartridge 22 may be suitably inserted in a suitably sized casing 24 of an actuator 16. After use, the cartridge 22 may then be replaced with another cartridge.

It is to be understood that the invention is by no means limited to the specific embodiments which have been illustrated and described herein, and that various embodiments thereof may indeed be made which come within the scope of the present invention as defined by the appended claims.

I claim:

1. A solid propellant grain comprises an elongate mass of solid propellant material having an aft end portion and a forward end portion, said solid propellant mass has a surface which is within said solid propellant mass and which extends longitudinally thereof to define a cavity which extends longitudinally partially through said solid propellant mass and which terminates at and does not extend into said aft end portion of said solid propellant mass, said aft end portion has an end burner configuration over at least a portion of its length wherein said aft end portion is free of perforations extending into said cavity, means for closing the forward end of said cavity, and plug means disposed in said cavity for supporting the solid propellant mass during burning of said aft end portion, said plug means is sized to provide a gap between said plug means and said surface over at least part of the length thereof for flame propagation radially of the grain from the surface over said at least part of the length thereof.

2. A grain according to claim 1 wherein said gap has a width between about 0.010 and 0.030 inch.

3. A grain according to claim 1 wherein said propellant surface extends longitudinally of said solid propellant mass through said forward end portion of said solid propellant mass whereby said cavity extends through said forward end portion of said solid propellant mass, the grain further comprises inhibitor means on said propellant surface in said forward portion.

4. A grain according to claim 3 wherein said inhibitor means comprises an insulation material disposed in said forward portion between said surface and said plug means and bonded to said surface.

5. A grain according to claim 3 wherein said plug means includes a plug means portion which is disposed between the portion of said plug means which is sized to provide said gap and the portion of said plug means in said forward end portion of said solid propellant mass and which is sized to sealingly engage said surface.

6. A grain according to claim 3 further comprises insulator means surrounding and engaging said solid propellant material over the length thereof and plug means disposed between and bonded to said insulator means and said inhibitor means in said forward end portion.

7. A grain according to claim 3 wherein said forward end portion is an end burner portion.

8. A grain according to claim 3 wherein said gap has a width between about 0.010 and 0.030 inch.

9. A grain according to claim 1 further comprises insulator means surrounding and engaging said solid propellant material over the length thereof and vent means in said insulator means and extending over the length of the grain for equalizing the pressure forward and aft of the grain.

10. A grain according to claim 1 wherein said forward end portion is an end burner portion.

11. In a gas generator which includes elongated casing means, a solid propellant grain having a forward portion, a middle portion, and an aft portion in end-to-end relation disposed in the casing means, said solid propellant grain has a surface which is within said grain and which extends longitudinally through at least said middle portion and which terminates at and does not extend into said aft portion to define a cavity which extends longitudinally through at least said middle portion and which terminates at and does not extend into said aft portion, said aft portion has an end burner configuration over at least a portion of its length wherein said aft portion is free of perforations extending into said cavity, means for closing the forward end of said cavity, and plug means disposed in said cavity for supporting the grain during burning of said aft portion, said plug means is sized to provide a gap between said plug means and said surface over at least part of the length thereof for flame propagation radially of the grain from the surface over said at least part of the length thereof. grain, said plug means is sized to define a gap between said said wall, means over at least part extending flame propagation surface within the grain.

12. A gas generator according to claim 11 wherein said gap has a width between about 0.010 and 0.030 inch.

13. A gas generator according to claim 11 wherein said surface extends longitudinally of said solid propellant mass through said forward portion whereby said cavity extends through said forward portion, the gas generator further comprises inhibitor means on said surface means in said forward portion.

14. A gas generator according to claim 13 wherein said inhibitor means comprises an insulation material disposed in said forward portion between said surface and said plug means and bonded to said surface.

15. A gas generator according to claim 13 wherein said plug means includes a plug means portion which is disposed between the portion of said plug means which is sized to provide said gap and the portion of said plug means in said forward grain portion and which is sized to sealingly engage said surface.

16. A gas generator according to claim 13 further comprises insulator means surrounding and engaging said solid propellant grain over the length thereof and plug means disposed in said forward portion between and bonded to said insulator means and said inhibitor means.

17. A gas generator according to claim 13 wherein said forward portion is an end burner portion.

18. A gas generator according to claim 13 wherein said gap has a width between about 0.010 and 0.030 inch.

19. A gas generator according to claim 11 further comprises insulator means surrounding and engaging said solid propellant grain over the length thereof and vent means in said insulator means and extending over the length of said solid propellant grain for equalizing the pressure forward and aft of said solid propellant grain.

20. A solid propellant grain comprises an elongate mass of solid propellant material having a forward portion, a middle portion, and an aft portion in end-to-end relation, said solid propellant material has a surface which is within said elongate mass and which extends longitudinally through said middle and forward portions to define a cavity which extends longitudinally through said middle and forward portions and which terminates at said aft portion, means for closing the forward end of said cavity, said aft portion has an end burner configuration over at least a portion of its length wherein said aft portion is free of perforations extending into said cavity, and plug means disposed in said cavity for supporting the elongate mass during burning of said aft portion, said plug means is sized to provide a gap between said plug means and said surface in said middle portion for flame propagation radially of the grain from said surface over the length thereof in said middle portion, and the grain further comprises inhibitor means on said surface in said forward portion.

* * * * *